(12) United States Patent
Nagashima et al.

(10) Patent No.: US 7,831,964 B2
(45) Date of Patent: Nov. 9, 2010

(54) PROGRAM AUTOMATIC CONVERTING METHOD AND PROGRAM AUTOMATIC CONVERTING DEVICE

(75) Inventors: Hironaka Nagashima, Saitama (JP); Shigeru Asao, Tokyo (JP); Masanobu Tsurumaki, Tokyo (JP)

(73) Assignee: System's Co., Ltd., Tokyo (JP)

( * ) Notice: Subject to any disclaimer, the term of this patent is extended or adjusted under 35 U.S.C. 154(b) by 1457 days.

(21) Appl. No.: 10/518,090

(22) PCT Filed: Nov. 28, 2003

(86) PCT No.: PCT/JP03/15305
§ 371 (c)(1),
(2), (4) Date: Jul. 19, 2005

(87) PCT Pub. No.: WO2004/051470
PCT Pub. Date: Jun. 17, 2004

(65) Prior Publication Data
US 2006/0156292 A1    Jul. 13, 2006

(30) Foreign Application Priority Data
Dec. 5, 2002    (JP) .............................. 2002-354264

(51) Int. Cl.
G06F 9/45    (2006.01)
G06F 9/44    (2006.01)
(52) U.S. Cl. ................. 717/137; 717/110; 717/122; 717/136
(58) Field of Classification Search .................. 717/137
See application file for complete search history.

(56) References Cited

U.S. PATENT DOCUMENTS 5,950,004 A * 9/1999 Bearse et al. ............... 717/146

(Continued)

FOREIGN PATENT DOCUMENTS

JP        64-046837 A    2/1989

(Continued)

OTHER PUBLICATIONS

ASCOS Software ACOS-6/NVX SEA/1 Caseworld Pattern /bubin Toroku Riyo no Tebiki EPI76-1, First edition, JP, NEC Corp., 1993.

(Continued)

*Primary Examiner*—Lewis A Bullock, Jr.
*Assistant Examiner*—Hang Pan
(74) *Attorney, Agent, or Firm*—Rader, Fishman & Grauer PLLC

(57) ABSTRACT

Automatic program conversion method: An analysis step analyzes the number of times that first instruction pattern information elements appear in an old source program; an analysis results output step outputs the analysis results; an instruction pattern conversion step converts old source program descriptions that correspond to the first instruction pattern information elements analyzed to appear a specified number of times or more, so as to correspond to second instruction pattern information elements; a new program output step outputs a new program resulting from the old source program converted in the instruction pattern conversion step; and an input receiving step receives user-entered manual input regarding the descriptions in the old source program that correspond to the first instruction pattern information elements analyzed to appear less than the specified number of times, so that such descriptions are modified for a new source program. Thus, program migration is achieved efficiently, reducing bugs.

10 Claims, 13 Drawing Sheets

U.S. PATENT DOCUMENTS

| | | | | | |
|---|---|---|---|---|---|
| 6,014,519 | A | * | 1/2000 | Egashira | 717/137 |
| 6,044,220 | A | * | 3/2000 | Breternitz, Jr. | 717/139 |
| 6,219,831 | B1 | * | 4/2001 | Ono | 717/136 |
| 6,901,588 | B1 | * | 5/2005 | Krapf et al. | 717/164 |
| 7,086,046 | B2 | * | 8/2006 | Barsness et al. | 717/152 |

FOREIGN PATENT DOCUMENTS

| | | |
|---|---|---|
| JP | 01-290036 A | 11/1989 |
| JP | 05-053822 A | 3/1993 |
| JP | 05-324343 A | 12/1993 |
| JP | 08-006815 A | 1/1996 |
| JP | 10-063508 A | 3/1998 |
| JP | 11-224199 A | 8/1999 |
| JP | 2002-014826 A | 1/2002 |
| JP | 2002-014826 A | 1/2002 |

OTHER PUBLICATIONS

ACOS Software ACOS-6/NVX SEA/1 Casewold Pattern Buhin Toroku riyo no Tebiki FPI76-1, first edition. JP. NEC Corp., 1993. pp. 8 to 14.

International Search Report mailed on Jan. 13, 2004.

Notification concerning ground of rejection mailed on Aug. 9, 2004.

\* cited by examiner

FIG. 3

| ID | Instruction Pattern Information |
|---|---|
| 1 | IDENTIFICATION    DIVISION |
| 2 | PROGRAM-ID        VARIABLE01 |
| 3 | ENVIRONMENT       DIVISION |
| 4 | CONFIGURATION     SECTION |
| 5 | INPUT-OUTPUT      SECTION |
| 6 | FILE-CONTROL |
| 7 | OBJECT-COMPUTER   CONVERSION01 |
| 8 | SELECT   VARIABLE01   ASSIGN TO  VARIABLE02 |
| 9 | SELECT   VARIABLE01  ASSIGN TO  VARIABLE02  ORGANIZATION  INDEXED  ACCESS MODE ... DYNAMIC  RECORD  KEY  VARIABLE03  FILE STATUS IS VARIABLE04 |
| 10 | SELECT   VARIABLE01 ASSIGN TO  VARIABLE02  ORGANIZATION  INDEXED  ACCESS MODE ... RANDOM  RECORD  KEY  VARIABLE03  FILE STATUS IS  VARIABLE04 |
| 11 | SOURCE-COMPUTER   VARIABLE01 |
| 12 | DATA        DIVISION |
| 13 | FILE        SECTION |
| 14 | WORKING-STORAGE        SECTION |
| 15 | NUMBER   VARIABLE01 |
| 16 | NUMBER   VARIABLE01   OCCURS   FIGURE01 DEPENDING  ON  VARIABLE02 |
| 17 | NUMBER   VARIABLE01   PIC × (FIGURE01) |
| 18 | NUMBER   VARIABLE01   PIC × (FIGURE01) OCCURS   FIGURE02   TIMES |
| ⋮ | |

FIG. 4

| ID | Appearance Count |
|---|---|
| 1 | 0 |
| 2 | 0 |
| 3 | 0 |
| 4 | 0 |
| ⋮ | ⋮ |

FIG. 5

```
000010***********************************************************
000020* CLIENT NAME    : DENZAI PACKAGE              *
000030* PROGRAM NAME  : CLIENT BUSINESS RANKING      *
000040* PROGRAM ID     : PSD712                      *
000050* CREATOR        : (I.C)                       *
000060* CREATION DATE  : 99.11.18                    *
000070* AMENDMENT DATE : 00.00.00                    *
000080***********************************************************
000090 IDENTIFICATION      DIVISION.
000100 PROGRAM-ID.         PSD712.
000110*
000120 ENVIRONMENT         DIVISION.
000130 CONFIGURATION       SECTION.
000140 SOURCE-COMPUTER.    V7070.
000150 OBJECT-COMPUTER.    V7070.
000160 INPUT-OUTPUT        SECTION.
000170 FILE-CONTROL.
000180********************************
000190* CLIENT MASTER SORTED
000200********************************
000210    SELECT  SDK30   ASSIGN  TO    K3-DK00-SDK30
000220            ORGANIZATION    SEQUENTIAL
000230            ACCESS          SEQUENTIAL
000240            SHARE           NO
000250            FILE    STATUS  STATUS-1 STATUS-2.
000260********************************
000270* CONTROL FILE
000280********************************
000290    SELECT  SDC00   ASSIGN  TO    C0-DK00-SDC00
000300            ORGANIZATION    RELATIVE
000310            ACCESS          DYNAMIC
000320            RELATIVE        C0-KEY
000330            SHARE           I-O
000340            FILE    STATUS  STATUS-1 STATUS-2.
                              ⋮
```

FIG. 6

| ID | Appearance Count |
|---|---|
| 1 | 1 |
| 2 | 0 |
| 3 | 0 |
| 4 | 0 |
| ⋮ | ⋮ |

FIG. 7

| ID | Appearance Count |
|---|---|
| 1 | 2 |
| 2 | 2 |
| 3 | 2 |
| 4 | 2 |
| ⋮ | ⋮ |
| 17 | 42 |
| ⋮ | ⋮ |

FIG. 8

| ID | AC | Instruction Pattern Information |
|---|---|---|
| 1 | 2 | IDENTIFICATION     DIVISION |
| 2 | 2 | PROGRAM-ID     VARIABLE01 |
| 3 | 2 | ENVIRONMENT     DIVISION |
| 4 | 2 | CONFIGURATION     SECTION |
| 5 | 2 | INPUT-OUTPUT     SECTION |
| 6 | 2 | FILE-CONTROL |
| 7 | 2 | OBJECT-COMPUTER     CONVERSION01 |
| 8 | 2 | SELECT     VARIABLE01  ASSIGN  TO  VARIABLE02 |
| 9 | 1 | SELECT     VARIABLE01  ASSIGN  TO  VARIABLE02  ORGANIZATION  INDEXED  ACCESS MODE ... DYNAMIC  RECORD  KEY  VARIABLE03  FILE  STATUS  IS  VARIABLE04 |
| 10 | 1 | SELECT     VARIABLE01  ASSIGN  TO  VARIABLE02  ORGANIZATION  INDEXED  ACCESS MODE ... RANDOM  RECORD  KEY  VARIABLE03  FILE  STATUS  IS  VARIABLE04 |
| 11 | 2 | SOURCE-COMPUTER     VARIABLE01 |
| 12 | 2 | DATA     DIVISION |
| 13 | 2 | FILE     SECTION |
| 14 | 2 | WORKING-STORAGE     SECTION |
| 15 | 12 | NUMBER     VARIABLE01 |
| 16 | 5 | NUMBER     VARIABLE01  OCCURS  FIGURE01  DEPENDING  ON  VARIABLE02 |
| 17 | 42 | NUMBER     VARIABLE01  PIC × (FIGURE01) |
| 18 | 2 | NUMBER     VARIABLE01  PIC × (FIGURE01) OCCURS  FIGURE02  TIMES |
| ⋮ | ⋮ | ⋮ |

FIG. 9

| ID | AC | Instruction Pattern Information |
|---|---|---|
| 1 | 2 | IDENTIFICATION    DIVISION |
| 2 | 2 | PROGRAM-ID    VARIABLE01 |
| 3 | 2 | ENVIRONMENT    DIVISION |
| 4 | 2 | CONFIGURATION    SECTION |
| 5 | 2 | INPUT-OUTPUT    SECTION |
| 6 | 2 | FILE-CONTROL |
| 7 | 2 | OBJECT-COMPUTER    CONVERSION01 |
| 8 | 2 | SELECT    VARIABLE01 ASSIGN TO VARIABLE02 |
| 9 | 1 | SELECT    VARIABLE01 ASSIGN TO VARIABLE02 ORGANIZATION INDEXED ACCESS MODE ... DYNAMIC RECORD KEY VARIABLE03 FILE STATUS IS VARIABLE04 |
| 10 | 1 | SELECT    VARIABLE01 ASSIGN TO VARIABLE02 ORGANIZATION INDEXED ACCESS MODE ... RANDOM RECORD KEY VARIABLE03 FILE STATUS IS VARIABLE04 |
| 11 | 2 | SOURCE-COMPUTER    VARIABLE01 |
| 12 | 2 | DATA    DIVISION |
| 13 | 2 | FILE    SECTION |
| 14 | 2 | WORKING-STORAGE    SECTION |
| 15 | <u>12</u> | <u>NUMBER    VARIABLE01</u> |
| 16 | <u>5</u> | <u>NUMBER    VARIABLE01 OCCURS FIGURE01 DEPENDING ON VARIABLE02</u> |
| 17 | <u>42</u> | <u>NUMBER    VARIABLE01 PIC x (FIGURE01)</u> |
| 18 | 2 | NUMBER    VARIABLE01 PIC x (FIGURE01) OCCURS FIGURE02 TIMES |
| ⋮ | | ⋮ |

FIG. 12

| ID | First Instruction Pattern Information | Second Instruction Pattern Information |
|---|---|---|
| 1 | SOURCE-COMPUTER. XXXXXX | #DEL# * SOURCE-COMPUTER. XXXXXX.<br>#CHG#   SOURCE-COMPUTER. IBM-AS400. |
| 2 | OBJECT-COMPUTER. XXXXXX | #DEL# * OBJECT-COMPUTER. XXXXXX.<br>#CHG#   OBJECT-COMPUTER. IBM-AS400. |
| 3 | SELECT filexxx ASSIGN xx-DK00- ~ | #DEL# *SELECT filexxx ASSIGN xx-DK00- ~<br>#CHG# SELECT filexxx ASSIGN DATABASE-FCxx |
| 4 | SELECT filexxx ASSIGN PR-SP00 | #DEL# *SELECT filexxx ASSIGN PR-SP00<br>#CHG# SELECT filexxx ASSIGN PRINTER-PR |
| 5 | SELECT filexxx ASSIGN SORTWORK. | #DEL# *SELECT filexxx ASSIGN SORTWORK.<br>#CHG# SELECT filexxx ASSIGN DATABASE-SORTWORK. |
| 6 | SELECT SCREEN ASSIGN GA-DK00 ~. | #DEL# *FORMAT-CONTROL.<br>#DEL# *   SELECT SCREEN ASSIGN GA-DK00<br>#DEL# * ~. |
| 7 | FORMAT SECTION. | #DEL# *FORMAT SECTION. |
| 8 | MD display name | #DEL# *MD display name. |
| 9 | WORKING-STORAGE SECTION | WORKING-STORAGE SECTION.<br>#ADD# COPY CONVWORK. |
| ⋮ | ⋮ | ⋮ |

FIG. 13

```
#ADD#  PROCESS GRAPHIC CVTPICGGRAPHIC QUOTE
#ADD#  IDENTIFICATION DIVISION.
000010**************************************************************
000020*  CLIENT NAME    : DENZAI PACKAGE              *
000030*  PROGRAM NAME :  CLIENT BUSINESS RANKING  *
000040*  PROGRAM ID  :  PSD712                          *
000050*  CREATOR      :  (I.C)                              *
000060*  CREATION DATE  :  99.11.18                    *
000070*  AMENDMENT DATE  :  00.00.00                 *
000080**************************************************************
#DEL# *IDENTIFICATION        DIVISION.
000100 PROGRAM-ID.         PSD712.
000110*
000120 ENVIRONMENT           DIVISION.
000130 CONFIGURATION         SECTION.
#DEL# *SOURCE-COMPUTER.    V7070.         ⎤
#CHG#  SOURCE-COMPUTER.    IBM-AS400.    ⎦ (1)
#DEL# *OBJECT-COMPUTER.    V7070.         ⎤
#CHG#  OBJECT-COMPUTER.    IBM-AS400.    ⎦ (2)
#ADD#  SPECIAL-NAMES.
#ADD#            COPY CONVSPCN.
000160 INPUT-OUTPUT       SECTION.
000170 FILE-CONTROL.
000180*******************************
000190*  CLIENT MASTER SORTED
000200*******************************
#DEL# *   SELECT  SDK30    ASSIGN    TO     K3-DK00-SDK30   ⎤
#CHG#     SELECT  SDK30    ASSIGN    TO     DATABASE-FCK3   ⎦
000220             ORGANIZATION    SEQUENTIAL
000230             ACCESS          SEQUENTIAL
#DEL# *             SHARE          NO
#DEL# *             FILE    STATUS  STATUS-1 STATUS-2.
#ADD#               FILE    STATUS  STATUS-2.
000260*******************************
000270*  CONTROL FILE
000280*******************************
#DEL# *   SELECT  SDC00    ASSIGN    TO     C0-DK00-SDC00
#CHG#     SELECT  SDC00    ASSIGN    TO     DATABASE-FCC0
000300             ORGANIZATION    RELATIVE
000310             ACCESS          DYNAMIC
000320             RELATIVE        C0-KEY
#DEL# *             SHARE          I-O
#DEL# *             FILE    STATUS  STATUS-1 STATUS-2.
#ADD#               FILE    STATUS  STATUS-2.
```

FIG. 14

```
000810*********************************************************
000820*    DATA          DIVISION
000830*********************************************************
000840 DATA           DIVISION.
000850 FILE           SECTION.
@DEL@ *   COPY    C-SDK30.
@ADD@  FD  SDK30.
000860    COPY    SDK30.
000870/
@DEL@ *   COPY    C-SDC00.
@ADD@  FD  SDC00.
000880    COPY    SDC00.
000890/
@DEL@ *   COPY    C-SDC20.
@ADD@  FD  SDC20.
000900    COPY    SDC20.
000910/
@DEL@ *   COPY    C-SDC40.
@ADD@  FD  SDC40.
000920    COPY    SDC40.
000930/
@DEL@ *   COPY    C-SDCQ0.
@ADD@  FD  SDCQ0.
000940    COPY    SDCQ0.
000950/
@DEL@ *   COPY    C-SJR00.
@ADD@  FD  SJR00.
000960    COPY    SJR00.
000970*
@DEL@ *   COPY    C-PRINT.
@ADD@  FD  PRINTER  IS  EXTERNAL.
000980    COPY    PRINT.
000990*******************************************
001000*  SORT  WORK
001010*******************************************
#DEL# *SD  SRTWORK1.
#CHG#  SD  SRTWORK1.
001030 01      SW-REC.
 1040  03     SW-000          PIC  X(01).
001050  03     SW-001-BUMON    PIC  9(04).
001060  03     SW-001-CHIKU    PIC  9(02).
001070  03     SW-002-TOKUI    PIC  S9(07) COMP-3.
001080  03     SW-003.
001090  05     SW-003-IDX      PIC  9(04).
001100  05     SW-004-URIAGE   PIC  S9(13) COMP-3.
```

PROGRAM AUTOMATIC CONVERTING METHOD AND PROGRAM AUTOMATIC CONVERTING DEVICE

BACKGROUND OF THE INVENTION

1. Field of the Invention

The present invention relates to automatic program conversion devices capable of analyzing computer programs and converting them in part or whole.

2. Description of the Related Art

Conventionally, several techniques have been employed for the automatic conversion of computer programs, and those that are for source programs and program scripts can be cited to begin with. In these conversion techniques, differences in description are automatically detected by obtaining compiler differences, and are automatically modified or a list is made thereof to improve efficiency in development. With them, a source program written in C language is parsed into tokens, and a database as well as an intermediate file is created for each token. Then relevant character strings are removed from or modified in the database to create a C language file from the information in the database and intermediate file, and thereby a target program is generated.

Secondly, another technique that may be cited is one in which based on program objects developed on a certain computer, software executable on another platform is automatically generated. In this technique, object code that can be executed under the computer resources provided is divided by a segment divider into an instruction code area and a data code area. Then the instruction code area is analyzed for instruction sets and OS primitives by an instruction code converter for conversion into statements written in a high-level programming language, while the data code area is checked on a data type that corresponds to a type of the instruction referencing, and then the data code area is converted by a data syntax converter into data definitions written in the high-level programming language. Then, using a reference area converter, the data definitions are assigned reference names, and are converted into a form in which the statements refer to the reference names. In this manner a high-level language program is generated.

With the first conventional technique, however, the premise is that conversion is automatically performed on every instruction that falls within the scope of the specification of a programming language used to write the source program to be converted. In terms of the second conventional technique, presumably, every program object present on a certain computer is subjected to automatic conversion.

In other words, it is not taken into account in either technique that a program in question will still be efficiently executable after being transferred to a different operating environment, so as to ensure that program's operating environment. Therefore, with the conventional techniques, which instruction patterns should undergo automatic or manual conversion is not distinguishable at all. This means that when developing an automatic conversion program capable of converting a program in a full- or semi-automatic manner, a programmer relying on the conventional techniques is unable to decide, in pursuit of conversion efficiency, which instruction pattern he or she should work on within a source program. Specifically, when using the conventional techniques, presumably, one has no choice but to develop a program that automatically converts even instruction patterns appearing only once.

SUMMARY OF THE INVENTION

Therefore, in order to overcome the drawbacks inherent in the prior art, a first aspect of the present invention is to provide an automatic program conversion method for making a program running in one environment executable in other environments. This method includes: where at least one pair of a first instruction pattern information element indicating an instruction pattern in an old source program, and a second instruction pattern information element indicating an instruction pattern in a new source program is stored in a memory part, an analysis step of analyzing, using an analysis means, the number of times that each of the first instruction pattern information elements appears in the old source program; an analysis results output step of outputting, using an output means, analysis results obtained in the analysis step; an instruction pattern conversion step of converting, using a conversion means, the descriptions in the old source program that correspond to the first instruction pattern information elements analyzed, in the analysis step, to appear a specified number of times or more (specify a number greater than one), so as to correspond to the second instruction pattern information elements that are individually paired with those first instruction pattern information elements; a new program output step of outputting a new source program resulting from the conversion of the old source program in the instruction pattern conversion step; and an input receiving step of receiving input, manually entered by a user using an input means, regarding the descriptions in the old source program that correspond to the first instruction pattern information elements analyzed, in the analysis step, to appear less than the specified number of times, so that those descriptions will be modified for the new source program. Thereby program migration can be achieved efficiently, reducing bugs.

In accordance with a second aspect of the present invention, the new program output step set forth above is to output the descriptions, having undergone the conversion in the instruction pattern conversion step, visually distinct from the other unconverted descriptions, within a new source program. Thereby, a programmer can visually check a program after conversion in an efficient manner.

It should be noted that the above program conversion method may be realized by software or hardware such as a dedicated circuit. In fact, the above capability is accomplished in the form of a program or an automatic program conversion device. Moreover, this conversion method can be considered a program creation method capable of creating a program compatible with a migration destination.

BRIEF DESCRIPTION OF THE DRAWINGS

FIG. 3 is an instruction pattern information management table in accordance with the first embodiment of the present invention.

FIG. 4 is an instruction pattern appearance count management table in accordance with the first embodiment of the present invention.

FIG. 5 shows an example of a program in accordance with the first embodiment of the present invention.

FIG. 6 is another instruction pattern appearance count management table in accordance with the first embodiment of the present invention.

FIG. 7 is yet another instruction pattern appearance count management table in accordance with the first embodiment of the present invention.

FIG. 8 shows an example of analysis results in accordance with the first embodiment of the present invention.

FIG. 9 shows an example of displaying analysis results in accordance with the first embodiment of the present invention.

FIG. 12 is an instruction pattern information management table in accordance with the second embodiment of the present invention.

FIG. 13 shows an example of a new program after conversion in accordance with the second embodiment of the present invention.

FIG. 14 shows another example of a new program in accordance with the second embodiment of the present invention.

DETAILED DESCRIPTION OF THE PREFERRED EMBODIMENTS

Figure 1:
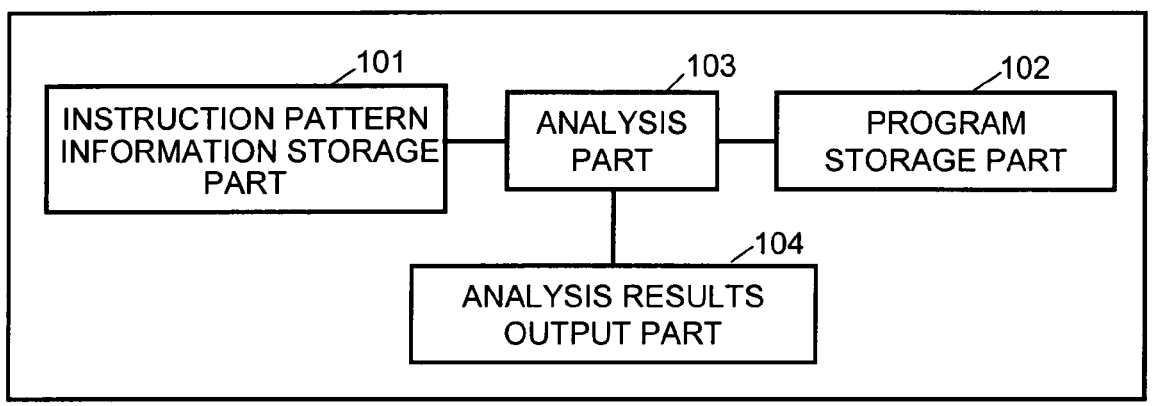
FIG. 1 is a block diagram of a program analyzer in accordance with a first embodiment of the present invention.

Preferred embodiments of a program analysis device and an automatic program conversion device of the present invention will be discussed hereinafter by referring to the accompanying drawings. Here note that the same reference numerals are used throughout the drawings and the description in order to refer to the same or like constituent elements in terms of behavior or function, and descriptions thereof will not be repeated.

Embodiment 1

Referring to FIG. 1, a block diagram illustrating a program analyzer of the present invention is shown. As illustrated therein, the program analyzer includes an instruction pattern information storage part 101, a program storage part 102, an analysis part 103, and an analysis results output part 104. The analyzer may be a personal computer incorporating an MPU, a memory, a hard disk, and the like.

The instruction pattern information storage part 101 stores at least one instruction pattern information element indicating an instruction pattern in a relevant program, and can be realized by either a non-volatile memory device or a volatile memory device.

The program storage part 102 is literally storage of a program, and can be realized by either a non-volatile memory device or a volatile memory device. The "program" in this context refers to a source program regardless of language, and includes so-called scripts such as HTML and XML. In addition, both procedural and declarative scripts are acceptable, and data sets required for a program to be executed (such as a header file) are included.

The analysis part 103 analyzes how many times each of the instruction pattern information elements appears (i.e., appearance count) in a program stored in the program storage part 102. The analysis part 103 can be realized in general by using an MPU, a memory, and the like. Processes assigned to the analysis part 103 are implemented in general by software, which is stored in a memory device such as ROM. It should be noted that the processes may be alternatively implemented by hardware (using a dedicated circuit).

The analysis results output part 104 outputs analysis results produced in the analysis part 103. Here the output would usually mean "display on a screen," but may not be limited to this and connotes printing to a printer or sending out to other devices. In addition, storing to hardware such as a memory device is also implied when referring to outputting. Moreover, the output part 104 may be with or without an output display, and can be realized, for example, by driver software for an output device.

Figure 2:
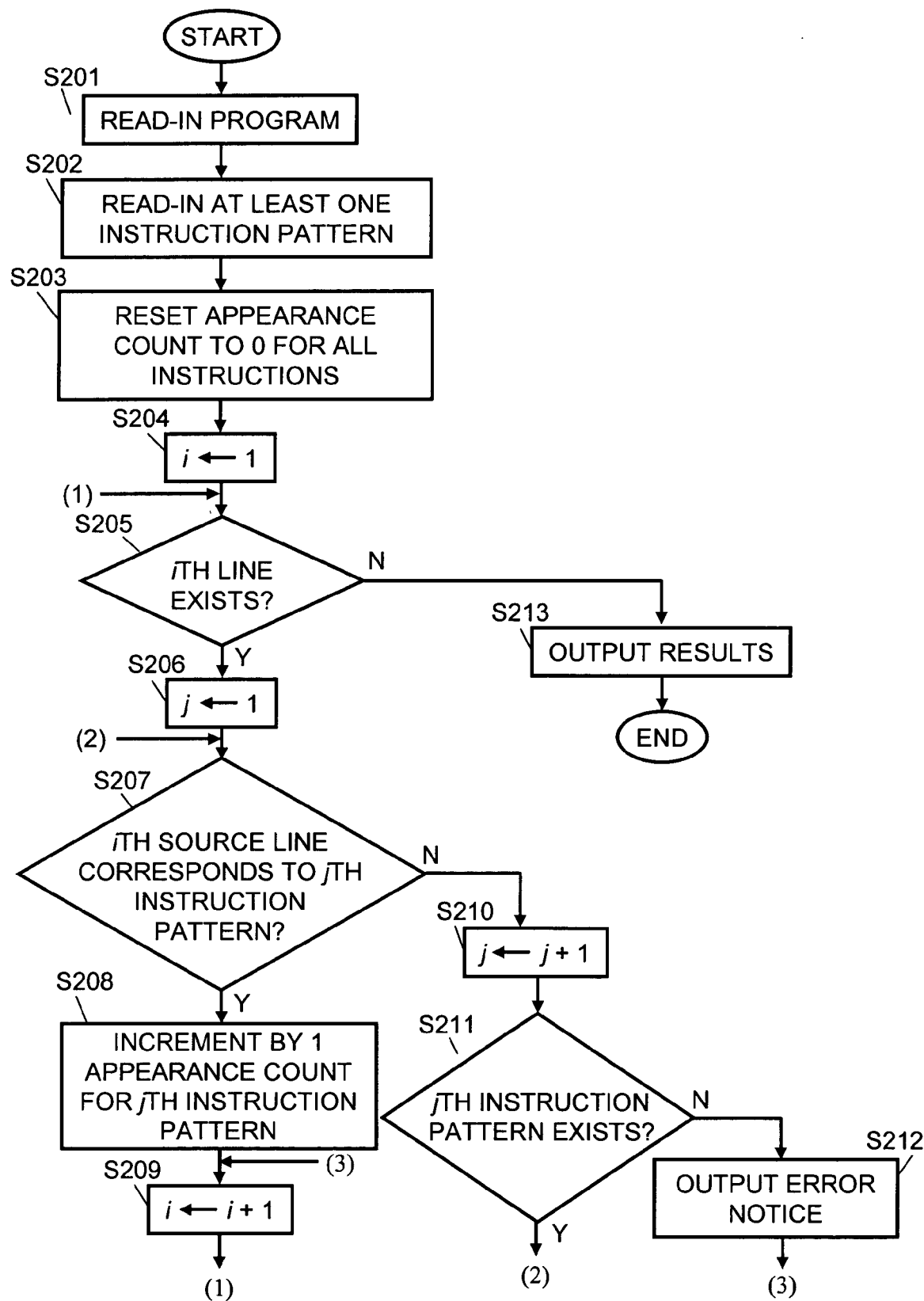
FIG. 2 is a flowchart depicting operations of the program analyzer in accordance with the first embodiment of the present invention.

Operations of the program analysis device in the first embodiment will be discussed hereinafter by referring to the flowchart shown in FIG. 2.

In step S201, the analysis part 103 reads-in a program from the program storage part 102, in which a program to be analyzed is stored. If more than one program exists in the storage part 102, the analysis part 103, for example, reads-in a program specified by a user.

In step S202, the analysis part 103 reads-in the at least one instruction pattern information element stored in the instruction pattern information storage part 101.

In step S203, the analysis part 103 resets the appearance count to 0 (zero) for all instruction patterns. Here note that all appearance counts are retained for each instruction pattern, for example, in a memory inside the analysis part 103.

In step S204, the analysis part 103 sets 1 (one) to a counter i. This counter serves as a program counter for a program read in S201, and in accordance with this counter, the analysis part 103 analyzes the ith line of the program read in S201 through the following processes. Note that the program here is assumed to have one instruction per line.

In step S205, the analysis part 103 judges whether or not the ith program source line is present in the program read-in. If the ith line exists, the analysis part 103 proceeds to S206; otherwise, it skips to S213.

In step S206, the analysis part 103 sets 1 (one) to a counter j. This counter serves in obtaining instruction pattern information used in the analysis from the at least one instruction pattern information element read in S202.

In step S207, the analysis part 103 judges whether or not the ith program source line corresponds to the jth instruction pattern information element. If the correspondence is confirmed, the analysis part 103 proceeds to S208; otherwise, it skips to S210. Further description is omitted because whether or not the ith program source corresponds to the jth instruction pattern information element can be judged by means of an existing technique such as lexical analysis or parsing.

In step S208, the analysis part 103 increments the appearance count by one for the instruction pattern that corresponds to the jth instruction pattern information element.

In step S209, the analysis part 103 increments the counter i, then returns to S205.

In step S210, the analysis part 103 increments the counter j.

In step S211, the analysis part 103 judges whether or not the jth instruction pattern is present in the instruction pattern information storage part 101. If the pattern in question exists, the analysis part 103 returns to S207; otherwise, it proceeds to S212.

In step S212, the analysis part 103 outputs an error notice, "No correspondence was found for the instruction pattern in question." Note that this process is not mandatory.

In step S213, the analysis results output part 104 outputs analysis results. The "analysis result" in this context refers to the number of instruction pattern appearances for each instruction pattern information element.

Hereinafter, the operations of the program analysis device in the first embodiment will be discussed in detail. FIG. 3 shows an instruction pattern information management table retained in the instruction pattern information storage part 101. In this table, more than one record is stacked under the common headings of "ID" and "Instruction Pattern Information." IDs are used for identifying each record and useful for handling multiple tables. "Instruction Pattern Information" contains attribute values indicating instruction pattern information.

Figure 4:
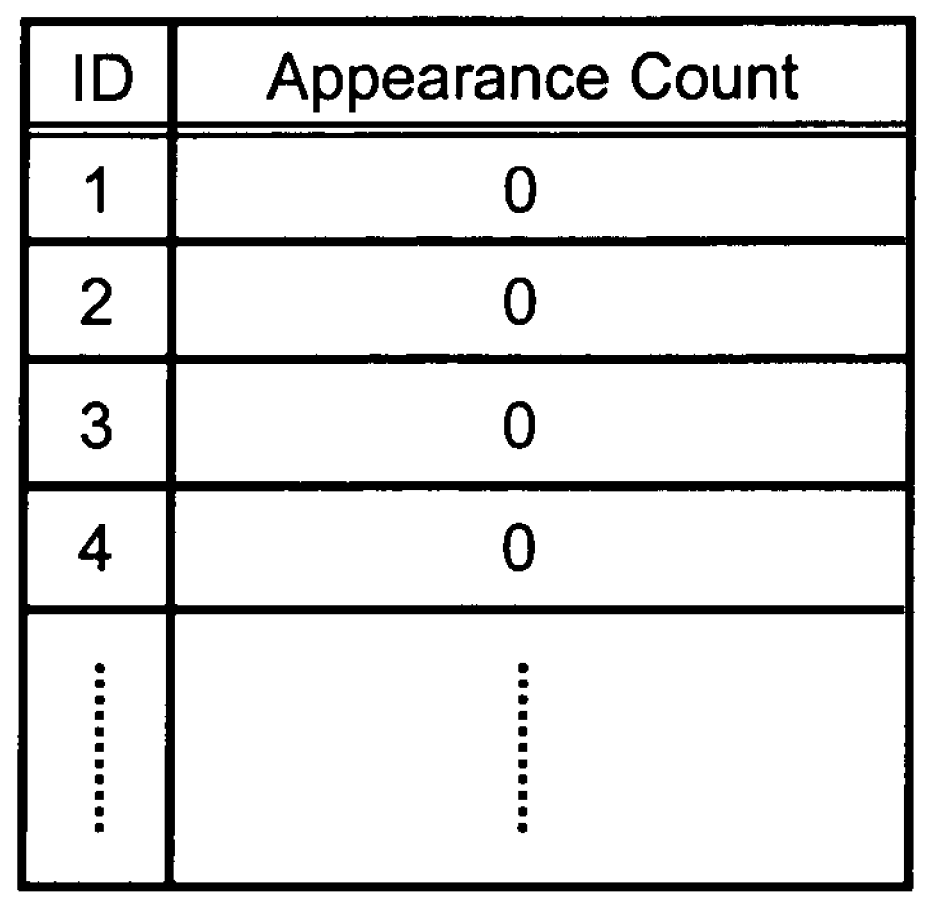

FIG. 4 shows an instruction pattern appearance count management table retained in the analysis part 103. In this table, at least one record is stored under the headings of "ID" and "Appearance Count." IDs in this table correspond to those in the table shown in FIG. 3. "Appearance Count" indicates how many times a relevant instruction pattern appears. The default value is 0 (zero).

FIG. 5 shows an example of a program stored in the program storage part 102. The program analysis device commences analyzing a program as shown in FIG. 5 upon request from a user. Comment lines always start with an asterisk (*). Here note that the program analysis device refrains from analyzing a line if it is judged to be a comment line, and then moves to the following line.

First, the analysis part 103 reads-in the first line of the program shown in FIG. 5. Since the first line is a comment, the analysis part 103 ignores it and moves onto the following line (i.e., increments the program counter). Again, the analysis is not performed on the second through eighth lines for the same reason.

When coming to the ninth line, the analysis part 103 reads-in "IDENTIFICATION DIVISION." and judges the ninth line corresponds to the instruction pattern information element whose ID is 1 in the instruction pattern information management table (FIG. 3). Then the analysis part 103 increments by one the "Appearance Count" value in the record whose ID is 1 in the instruction pattern appearance count management table (FIG. 4). A resultant table is shown in FIG. 6.

Proceeding to the tenth line, the analysis part 103 reads-in "PROGRAM-ID. PSD712." and judges the line corresponds to the instruction pattern information element whose ID is 2 in the information management table (FIG. 3). It should be noted that the terms "VARIABLE01," "VARIABLE02" and the like represent a variable, which is composed of an alphanumeric character string. In the tenth line "PSD712" is a variable. When the judgment is completed, the analysis part 103 increments by one the "Appearance Count" value, where ID is 2 in the instruction pattern appearance count management table.

The processing as described above is repeated on all the lines within the program in FIG. 5, and a resultant table is obtained as shown in FIG. 7, which is an instruction pattern appearance count management table.

Subsequent to this, the analysis results output part 104 outputs analysis results as shown in FIG. 8. The analysis results are summarized under the headings of "ID," "AC", and "Instruction Pattern Information". Here "AC" stands for Appearance Count. The results in FIG. 8 are composed of the instruction pattern information management table in FIG. 3 and the instruction pattern appearance count management table in FIG. 7. More specifically, so that two tables (FIGS. 3 and 7 in this case) are merged in accordance with a column that they have in common so as to form a single table as shown in FIG. 8, a join operation is performed, where values in the "ID" column are used as a join condition.

As clarified above, the first embodiment of the present invention enables the analysis of instruction patterns within a source program that needs to be converted, whereby an automatic conversion program capable of efficiently converting source programs can be developed. Note that how programs are automatically converted based on the analysis results obtained in the first embodiment will be discussed hereinafter in the second embodiment.

Another important aspect of the first embodiment is that those instruction patterns appearing more than a given number of times may be displayed so as to stand out from the others. Doing so produces analysis results as shown in FIG. 9, for example. In the case of FIG. 9, the instruction patterns appearing three times or more are underlined. Here note that in order to achieve the same effect, the embodiment is not limited to that of FIG. 9, and various alternatives are acceptable.

The operations described in the first embodiment may be realized by a computer-readable program. For this, the program may be distributed in a recording medium such as CD-ROM or through a network, or may be broadcast, and the same will apply to any embodiments other than this. It should be noted that a program capable of executing the operations in the first embodiment is provided so that in a computer storing at least one instruction pattern information element indicating an instruction pattern in a program, an analysis step of analyzing the number of times that each of the instruction pattern information elements appears (i.e., appearance count) in the program, and an analysis results output step of outputting analysis results obtained in the analysis step are performed.

In addition, in order to perform the program analysis, a single device is employed in the first embodiment, but this process may be executed by sharing the task among multiple devices. In other words, the same effect as described above will be achieved if program analysis can be completed in combination with more than one device using a program analysis method. Here the program analysis method includes: where at least one instruction pattern information element indicating an instruction pattern in a program is stored, an analysis step of analyzing the number of times that each of the instruction pattern information elements appears (i.e., appearance count) in the program, and an analysis results output step of outputting analysis results obtained in the analysis step.

Embodiment 2

Figure 10:
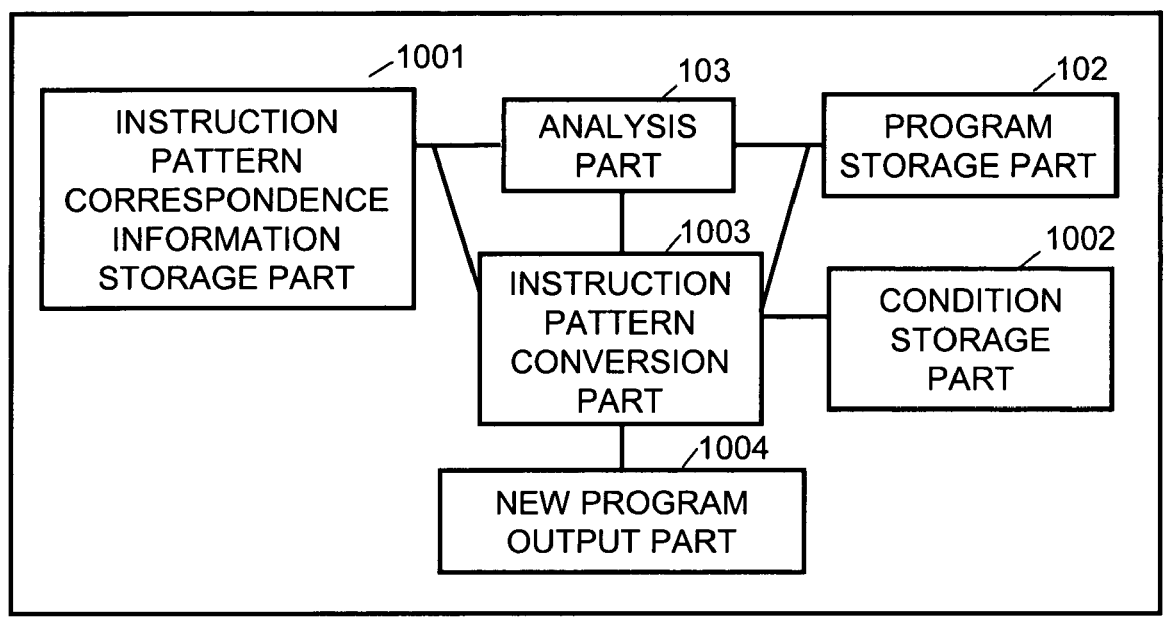
FIG. 10 is a block diagram of an automatic program converter in accordance with a second embodiment of the present invention.

Referring to FIG. 10, a block diagram illustrating an automatic program conversion device of the present invention is shown. As illustrated therein, the automatic program conversion device includes an instruction pattern correspondence information storage part 1001, a program storage part 102, an analysis part 103, a condition storage part 1002, an instruction pattern conversion part 1003, and a new program output part 1004. For this, a personal computer incorporating an MPU, a memory, a hard disk, and the like is employed.

The instruction pattern correspondence information storage part 1001 stores at least one pair of a first instruction pattern information element indicating an instruction pattern in an old program (program to be converted), and a second instruction pattern information element indicating an instruction pattern in a new program (program having undergone conversion). The correspondence storage part 1001 can be realized by either a non-volatile memory device or a volatile memory device.

The condition storage part 1002 stores conditions used for automatically converting part of an old program that corresponds to first instruction pattern information elements, so as to correspond to second instruction pattern information elements. The condition storage part 1002 can be realized by either a non-volatile memory device or volatile memory device. In most cases the conditions are embedded in a program for executing the process assigned to the instruction pattern conversion part 1003 (including a case in which conditions are defined in a header file). Also note that the conditions are based on the analysis results obtained from the analysis part 103.

The instruction pattern conversion part 1003 performs a conversion process on a program stored in the program storage part 102 (an old program) so that part of the old program corresponding to the first instruction pattern information element that meets a condition stored in the condition storage part 1002 corresponds to the second instruction pattern information element that is paired with the first instruction pattern information element. The conversion part 1003 can be realized in general using an MPU and a memory. Processes required for the conversion part 1003 to convert relevant information is generally realized by software, which is stored in a memory device such as ROM. This may be, however, substituted for by hardware (using a dedicated circuit).

The new program output part 1004 outputs the outcome of the program conversion performed by the program conversion part 1003 as a new program. Here the output would usually mean "display on a screen"; however, this includes printing to a printer, sending out to other devices, and recording to a recording medium (a hard disk, digital multi-purpose disc, or the like). The output part 1004 may be with or without an output display or a recording medium, and can be realized, for example, by driver software for an output device.

Figure 11:
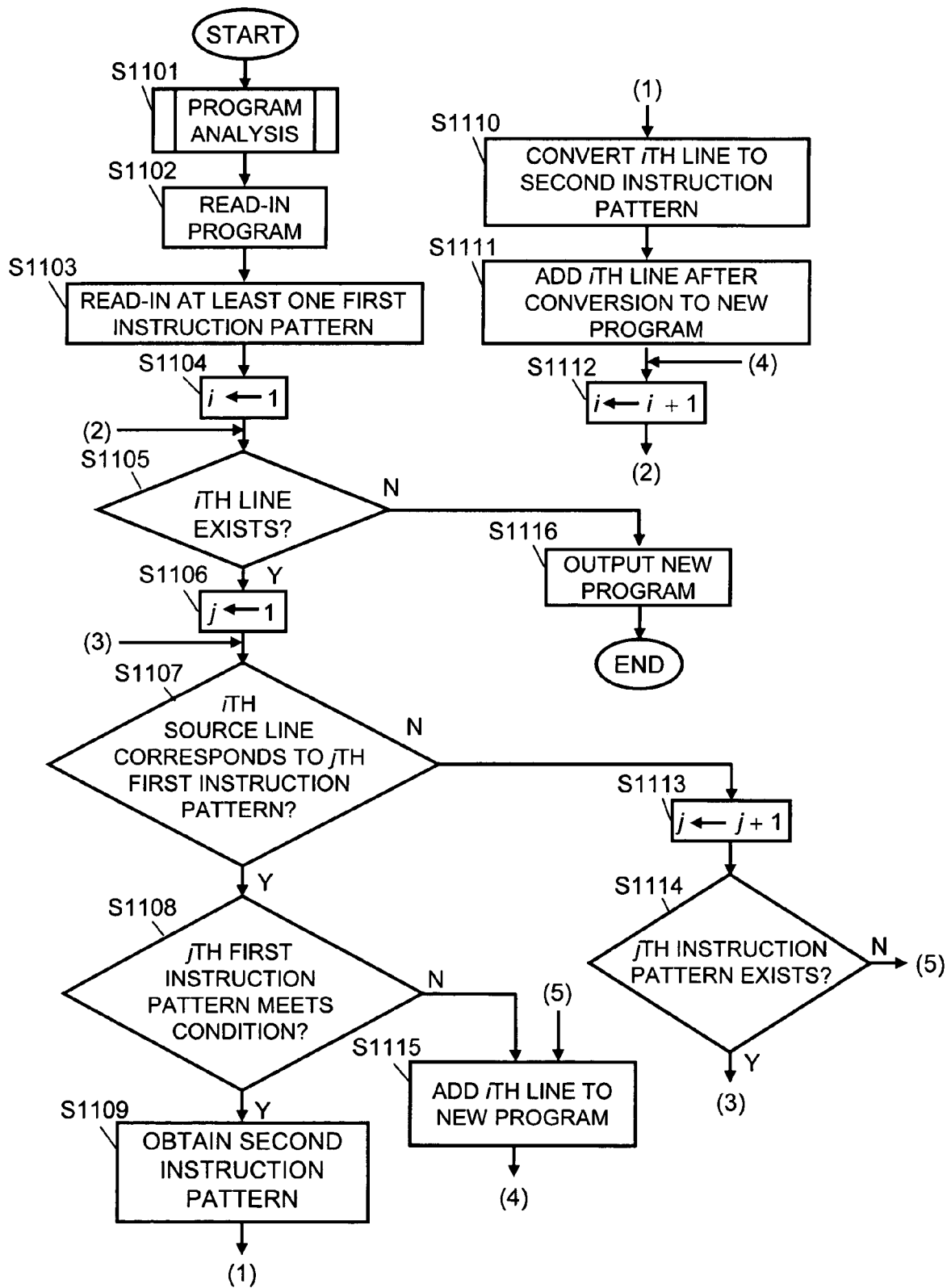
FIG. 11 is a flowchart depicting operations of the automatic program converter in accordance with the second embodiment of the present invention.

Operations of the automatic program conversion device in the second embodiment will be discussed hereinafter by referring to the flowchart shown in FIG. 11.

In step S1101, a program analysis routine is executed. Through this routine a program analysis is completed as already discussed using the flowchart in FIG. 2, and the appearance count is output for each instruction pattern accordingly.

In step S1102, the instruction pattern conversion part 1003 reads-in a program stored in the program storage part 102. If more than one program exists, the conversion part 1003 reads-in a program specified by a user.

In step S1103, the conversion part 1003 reads-in the at least one first instruction pattern information element stored in the instruction pattern correspondence information storage part 1001.

In step 1104, the conversion part 1003 sets 1 (one) to a counter i. This counter serves as a program counter for a program read in S1102. In other words, the conversion part 1003 converts the ith line of the program read in S1102 through the following processes. Note that the program here is assumed to have one instruction per line.

In step S1105, the conversion part 1003 judges whether or not a program source is present in the ith line of the program read in S102. If the relevant source exists, then the conversion part 1003 proceeds to S1106; otherwise, it skips to S1116.

In step S1106, the conversion part 1003 sets 1 (one) to a counter j. This counter serves in obtaining first instruction pattern information for use in the conversion from the at least one first instruction pattern information element read in S1103.

In step S1107, the conversion part 1003 judges whether or not the program source in the ith line corresponds to the jth first instruction pattern information element. If the correspondence is confirmed, the conversion part 1003 proceeds to S1108; otherwise, it skips to S1113.

It should be noted that whether or not the ith program source corresponds to the jth first instruction pattern information element can be judged by means of lexical analysis or parsing.

In step S1108, the conversion part 1003 judges whether or not the jth first instruction pattern information element meets a condition in the condition storage part 1002, based on the analysis results obtained from the program analysis routine in S1101. If the condition is met, the conversion part 1003 proceeds to S1109; otherwise, it skips to S1115.

In step S1109, from the instruction pattern correspondence information storage part 1001, the conversion part 1003 obtains the second instruction pattern information element that is paired with the jth first instruction pattern information element.

In step S1110, the conversion part 1003 converts the ith program source into a pattern as indicated by the second instruction pattern information element obtained in S1109.

In step S1111, the conversion part 1003 adds the ith source, having been converted in S1110, to a new program. Note that the new program is assumed to be in a file, for which file generation and opening were completed at the time of initialization (not shown).

In step S1112, after incrementing the counter i, the conversion part 1003 returns to S1105.

In step S1113, the counter j is incremented.

In step S1114, the conversion part 1003 judges whether or not the jth first instruction pattern information element exists. If it exists, the conversion part 1003 returns to S1107; otherwise, it moves onto S1115.

In step S1115, the conversion part 1003 adds the ith source to a new program. In this example, the ith source is a comment line.

In step S1116, the new program output part 1004 outputs a program having undergone the conversion (a new program). The "output" in this context can include simple storage to a recording medium such as a hard disk.

It should be noted that instruction pattern elements failing to meet the conditions in the condition storage part 1002 and left unconverted into their corresponding second instruction patterns will be manually rewritten by a programmer using an input means such as a keyboard. This means that the automatic program conversion device includes an input means such as a key board or mouse, not shown in the figures.

Hereinafter, the operations of the automatic program conversion device in the second embodiment will be discussed in detail. FIG. 12 shows an instruction pattern information management table stored in the instruction pattern correspondence information storage part 1001. In this table, more than one record is stacked under the common headings of "ID," "First Instruction Pattern Information," and "Second Instruction Pattern Information." IDs are used for identifying each record. This management table is used as a correspondence table when conversion takes place in search of the correspondence between the source lines in question appearing in a program as the first instruction pattern information elements, and the second instruction pattern information elements that are individually paired with them. Specifically, referring to FIG. 12, "SOURCE-COMPUTER. XXXXXX." in the "First Instruction Pattern Information" column is converted into "#CHG# SOURCE-COMPUTER. IBM-AS400." as indicated in the "Second Instruction Pattern Information" column. Here "XXXXXX" represents any variable name, and "#DEL#" represents the deletion of the corresponding portion. "#CHG#" means that the corresponding portion is the outcome of the conversion. Moreover, lines with an asterisk (*) are comment lines, where each comment is placed between #'s.

Referring to FIG. 5, an old program stored in the program storage part 102 is shown as an example, and referring to FIG. 8, an instruction pattern appearance count management table is shown involving the analysis results obtained by the analysis part 103. In addition, the condition storage part 1002 is assumed to retain a condition that program lines as indicated in the "First Instruction Pattern Information" column are to be converted into their corresponding second instruction pattern information elements, if the number of their appearances happens to be two or more.

Subsequent to the conversion of the old program in FIG. 5 using the instruction pattern conversion part 1003, a new program created thereby is outputted from the new program output part 1004. The new program is as shown in FIG. 13, where newly created lines are underlined so that they are recognized as those having undergone the conversion, differing from the others.

In the new program (FIG. 13), the lines numbered "(1)" underwent the conversion in accordance with ID 1 in the instruction pattern information management table. Likewise, the lines numbered "(2)" are converted lines in accordance with ID 2.

It should be noted that referring to FIG. 12, only one example is shown of the instruction pattern information management table for the sake of brevity, where the new program corresponds to the old program on a per-n-lines basis (n is a positive integer). However, a correspondence ratio of a new program to an old program can also be n to m lines, where n is a positive integer, and m is any positive integer greater than one.

In accordance with the second embodiment of the present invention, instruction patterns appearing in a source program to be converted can be analyzed, and thereby full- or semi-automatic conversion can be efficiently achieved. In fact, a programmer will readily engage in conversion work on instruction patterns if limited infrequency, while other instruction patterns appearing a specified number of times (e.g., twice) or more require complex and time-consuming work, and are better left to a conversion program. Thus in the preferred embodiments of the present invention a source program conversion program is developed in advance, so that program conversion is efficiently performed in an automatic fashion. On top of that by using the automatic program conversion device in the second embodiment, for example, program migration from one operating environment to another can be implemented in an even more efficient and secure manner.

As stated above, in accordance with the second embodiment, the instruction patterns appearing less than a specified number of times are to be modified manually. For this, the automatic program conversion device includes an input means in order for a programmer to carry out manual modification. Here the "input means" is a keyboard or a mouse, for example.

As shown in FIG. 14, in which portions manually modified, portions automatically converted, and portions unconverted are shown as such individually within a new program, storage of or screen display of the new program may also be implemented in the second embodiment. In FIG. 14, a comment between @'s indicates how a relevant line was manually processed. "@DEL@" represents manually deleted, and "@ADD@," manually added.

In the second embodiment, in order to determine whether to perform conversion automatically or manually, the number of times that each of the first instruction pattern information elements appears in a program is used as a parameter (i.e., in the above example, automatic conversion is performed on condition that the appearance count is two or more.) However, the conversion type may be determined using other conditions. Also, another feasible configuration is one in which first instruction patterns that will be automatically converted are specified in accordance with input from a user.

The operations described in the second embodiment may be realized by a computer-readable program. For this, the program may be distributed in a recording medium such as CD-ROM or through a network, or may be broadcast. This applies to any embodiments other than this. It should be noted that a program capable of executing the operations in the second embodiment is provided, so that performed in a computer storing at least one pair of a first instruction pattern information element indicating an instruction pattern in an old source program, and a second instruction pattern information element indicating an instruction pattern in a new source program are: an analysis step of analyzing the number of times that each of the first instruction pattern information elements appears (i.e., appearance count) in the old source program; an analysis results output step of outputting analysis results obtained in the analysis step; an instruction pattern conversion step of converting the descriptions in the old source program that correspond to the first instruction pattern information elements analyzed, in the analysis step, to appear a specified number of times or more (specify a number greater than one), so as to correspond to the second instruction pattern information elements that are individually paired with the conversion-target first instruction pattern information elements; a new program output step of outputting a new program resulting from the conversion of the old source program in the instruction pattern conversion step; and an input receiving step of receiving input manually entered by a user, regarding the descriptions in the old source program that correspond to the first instruction pattern information elements analyzed, in the analysis step, to appear less than the specified number of times, so that those descriptions will be modified for the new program.

Moreover, in order to perform the program conversion, a single automatic program conversion device is employed in the second embodiment, but the conversion process may be performed by sharing the task among multiple devices. In other words, it is also acceptable that more than one device is employed for implementing an automatic program conversion method characterized as follows. Provided for making a program running in one environment executable in other environments, the method includes: where at least one pair of a first instruction pattern information element indicating an instruction pattern in an old source program and a second information pattern information element indicating an instruction patterns in a new source program is stored in a memory part, an analysis step of analyzing, using an analysis means, the number of times that each of the first instruction pattern information elements appears (i.e., appearance count) in the old source program; an analysis results output step of outputting, using an output means, analysis results obtained in the analysis step; an instruction pattern conversion step of converting, using a conversion means, the descriptions in the old source program that correspond to the fist instruction pattern information elements analyzed, in the analysis step, to appear a specified number of times or more (specify a number greater than one), so as to correspond to the second instruction pattern information elements that are individually paired with the conversion-target first instruction pattern information elements; a new program output step of outputting, using an output means, a new source program resulting from the conversion of the old source program in the instruction pattern conversion step; and an input receiving step of receiving input, manually entered by a user using an input means, regarding the descriptions in the old source program that correspond to the first instruction pattern information elements analyzed, in the analysis step, to appear less than the specified number of times, so that those descriptions will be modified for the new source program. Thereby program migration is achieved efficiently, reducing bugs.

In addition, the above automatic program conversion device in the second embodiment can be interpreted as a device capable of implementing a method of creating a program running in a new environment (i.e., an environment into which the program is migrated). More specifically, the automatic program conversion device implements a program creation method characterized as follows. Provided for creating a program for making a program running in one environment executable in other environments, the program creation method includes: where at least one pair of a first instruction pattern information element indicating an instruction pattern in an old source program, and a second instruction pattern information element indicating an instruction pattern in a new source program is stored in a memory part, an analysis step of analyzing, using an analysis means, the number of times that each of the first instruction pattern information elements appears (i.e., appearance count) in the old source program; an analysis results output step of outputting, using an output means, analysis results obtained in the analysis step; an instruction pattern conversion step of converting, using a conversion means, the descriptions in the old source program that correspond to the first instruction pattern information elements analyzed, in the analysis step, to appear a specified number of times or more (specify a number greater than one), so as to correspond to the second instruction pattern information elements that are individually paired with the conversion-target first instruction pattern information elements; a new program output step of outputting, using an output means, a new source program resulting from the conversion of the old source program in the instruction pattern conversion step; and an input receiving step of receiving input, manually entered by a user using an input means, regarding the descriptions in the old source program that correspond to the first instruction pattern information elements analyzed, in the analysis step, to appear less than the specified number of times, so that those descriptions will be modified for the new source program. Here the new program output step may include a feature that the descriptions having undergone the conversion in the instruction pattern conversion step are outputted visually distinct from the other unconverted descriptions, within a new source program.

Also, in accordance with the second embodiment, a program creation device capable of implementing the above program creation method can be interpreted as a device capable of creating a program that is operable in a new environment (i.e., an environment into which the program is migrated). Specifically, provided for creating from an old source program running in one environment a new source program executable in other environments, the program creation device includes: an instruction pattern correspondence information storage part, in which at least one pair of a first instruction pattern information element indicating an instruction pattern in an old source program, and a second instruction pattern information element indicating an instruction pattern in a new source program is stored, an analysis part for analyzing the number of times that each of the first instruction pattern information elements appears (i.e., appearance count) in the old source program; an analysis results output part for outputting analysis results obtained by the analysis part; an instruction pattern conversion part for converting the descriptions in the old source program that correspond to the first instruction pattern information elements analyzed by the analysis part to appear a specified number of times or more (specify a number greater than one), so as to correspond to the second instruction pattern information elements that are individually paired with the conversion-target first instruction pattern information elements; a new program output part for outputting a new program resulting from the conversion of the old program in the instruction pattern conversion part; and an input receiving part for receiving input manually entered by a user, regarding the descriptions in the old source program that correspond to the first instruction pattern information elements analyzed by the analysis part to appear less than the specified number of times, so that those descriptions will be modified for the new source program. Here the new program output part may output the descriptions, having undergone the conversion by the instruction pattern conversion part, visually distinct from the other unconverted descriptions, within a new source program.

The embodiments of the invention disclosed herein are those considered to be preferred, and various changes and/or modifications can be made without departing from the scope of the invention. The scope of the invention is indicated by the appended claims rather than by the foregoing description, and all changes and/or modifications that come within the meaning and range of equivalency of the claims are intended to be embraced therein.

INDUSTRIAL APPLICABILITY

The method and device for the program conversion, and the like in accordance with the present invention provide for the analysis of instruction patterns within a program to be converted. Thus they are effective for use as a method and a device for efficient migration of computer programs.

REFERENCE NUMERALS USED IN THE DRAWINGS

101 Instruction pattern information storage part
102 Program storage part
103 Analysis part
104 Analysis results output part
1001 Instruction pattern correspondence information storage part
1002 Condition storage part
1003 Instruction pattern conversion part
1004 New program output part

What is claimed is:

1. An automatic program conversion method for making a program running in one environment executable in other environments, said conversion method comprising:
   where at least one pair of a first instruction pattern information element representing an instruction pattern in an old source program and a second instruction pattern information element representing an instruction pattern in a new source program is stored in a memory part,
   an analysis step of analyzing, using an analysis means, a number of times that said first instruction pattern information element appears in said old source program;

an analysis results output step of outputting, using an output means, analysis results obtained in said analysis step;

an instruction pattern conversion step of automatically converting, using a conversion means, descriptions in said old source program that correspond to said first instruction pattern information element analyzed, in said analysis step, as appearing a predetermined number of times or more, so as to correspond to said second instruction pattern information element that is paired with said first instruction pattern information element appearing said predetermined number of times or more;

a new program output step of outputting, using an output means, a new source program resulting from said old source program having been converted in said instruction pattern conversion step; and an input receiving step of receiving input, manually entered by a user using an input means, regarding descriptions in said old source program that correspond to said first instruction pattern information element analyzed, in said analysis step, as appearing less than said predetermined number of times, so that said descriptions will be modified for said new source program.

2. The automatic program conversion method as defined in claim 1, wherein said new program output step outputs said descriptions, having been converted in said instruction pattern conversion step, visually distinct from unconverted descriptions, in said new source program.

3. A computer program stored in a program storage part, the program performing:

where at least one pair of a first instruction pattern information element representing an instruction pattern in an old source program and a second instruction pattern information element representing an instruction pattern in a new source program is stored in a computer, an analysis step of analyzing a number of times that said first instruction pattern information element appears in said source program;

an analysis results output step of outputting analysis results obtained in said analysis step;

an instruction pattern conversion step of automatically converting descriptions in said old source program that correspond to said first instruction pattern information element analyzed, in said analysis step, as appearing a predetermined number of times or more, so as to correspond to said second instruction pattern information element that is paired with said first instruction pattern information element appearing said predetermined number of times or more;

a new program output step of outputting a new program resulting from said old source program having been converted in said instruction pattern conversion step; and an input receiving step of receiving input manually entered by a user, regarding descriptions in said old source program that correspond to said first instruction pattern information element analyzed, in said analysis step, as appearing less than said predetermined number of times, so that said descriptions will be modified for said new source program.

4. The program as defined in claim 3, wherein said new program output step outputs said descriptions, having been converted in said instruction pattern conversion step, visually distinct from unconverted descriptions, in said new source program.

5. An automatic program conversion device comprising: an instruction pattern correspondence information storage part, wherein at least one pair of a first instruction pattern information element representing an instruction pattern in an old source program and a second instruction pattern information element representing an instruction pattern in a new source program is stored;

an analysis part for analyzing a number of times that said first instruction pattern information element appears in said source program;

an analysis results output part for outputting analysis results obtained in said analysis part;

an instruction pattern conversion part for automatically converting descriptions in said source program that correspond to said first instruction pattern information element analyzed, in said analysis part, as appearing a predetermined number of times or more, so as to correspond to said second instruction pattern information element that is paired with said first instruction pattern information element appearing said predetermined number of times or more;

a new program output part for outputting a new source program resulting from said old source program having been converted in said instruction pattern conversion part; and an input receiving part for receiving input manually entered by a user, regarding descriptions in said old source program that correspond to said first instruction pattern information element analyzed, in said analysis part, as appearing less than said predetermined number of times, so that said descriptions will be modified for said new source program.

6. The automatic program conversion device as defined in claim 5, wherein said new program output part outputs said descriptions, having been converted in said instruction pattern conversion part, visually distinct from unconverted descriptions, in said source program.

7. A program creation method for creating a program capable of creating from an old source program running in one environment a new source program executable in other environments, said method comprising:

an analysis step of analyzing a number of times that at least one first instruction pattern information element appears in said old source program;

an analysis results output step of outputting analysis results obtained in said analysis step;

an instruction pattern conversion step of automatically converting descriptions in said old source program that correspond to said first instruction pattern information element analyzed, in said analysis step, as appearing a predetermined number of times or more, so as to correspond to a second instruction pattern information element that is paired with said first instruction pattern information element appearing said predetermined number of times or more;

a new program output step of outputting said new source program resulting from said old source program having been converted in said instruction pattern conversion step; and an input receiving step of receiving input manually entered by a user, regarding descriptions in said old source program that correspond to said first instruction pattern information element analyzed, in said analysis step, as appearing less than said predetermined number of times, so that said descriptions will be modified for said new source program.

8. The program creation method as defined in claim 7, wherein said new program output step outputs said descriptions, having been converted in said instruction pattern conversion step, visually distinct from unconverted descriptions, in said new source program.

9. A program creation device for creating a program capable of creating from an old source program running in one environment a new source program executable in other environments, said device comprising:

an instruction pattern correspondence information storage part, wherein at least one pair of a first instruction pattern information element representing an instruction pattern in said old source program and a second instruction pattern information element representing an instruction pattern in said new source program is stored;

an analysis part for analyzing a number of times that said first instruction pattern information element appears in said source program;

an analysis results output part for outputting analysis results obtained in said analysis part;

an instruction pattern conversion part for automatically converting descriptions in said old source program that correspond to said first instruction pattern information element analyzed, in said analysis part, as appearing a predetermined number of times or more, so as to correspond to said second instruction pattern information element that is paired with said first instruction pattern information element appearing said predetermined number of times or more;

a new program output part for outputting said new source program resulting from said old source program having been converted in said instruction pattern conversion part; and an input receiving part for receiving input manually entered by a user, regarding descriptions in said old source program that correspond to said first instruction pattern information element analyzed, in said analysis part, as appearing less than said predetermined number of times, so that said descriptions will be modified for said new source program.

10. The program creation device as defined in claim 9, wherein said new program output part outputs said descriptions, having been converted in said instruction pattern conversion part, visually distinct from unconverted descriptions, in said source program.

* * * * *